(12) United States Patent
Potaraju et al.

(10) Patent No.: US 12,008,084 B2
(45) Date of Patent: Jun. 11, 2024

(54) SYSTEM AND METHOD FOR AUTONOMOUS SOFTWARE LICENSING DURING BOOTUP PROCESS

(71) Applicant: Barracuda Networks, Inc., Campbell, CA (US)

(72) Inventors: Hari Potaraju, San Jose, CA (US); Dipen Modi, San Jose, CA (US); Giovanni Rodriguez, Fremont, CA (US)

(73) Assignee: Barracuda Networks, Inc., Campbell, CA (US)

(*) Notice: Subject to any disclaimer, the term of this patent is extended or adjusted under 35 U.S.C. 154(b) by 311 days.

(21) Appl. No.: 17/707,482

(22) Filed: Mar. 29, 2022

(65) Prior Publication Data
US 2023/0244763 A1    Aug. 3, 2023

Related U.S. Application Data

(60) Provisional application No. 63/305,761, filed on Feb. 2, 2022.

(51) Int. Cl.
*G06F 21/10*    (2013.01)
*G06F 9/4401*   (2018.01)

(52) U.S. Cl.
CPC .......... *G06F 21/105* (2013.01); *G06F 9/4401* (2013.01); *G06F 21/1077* (2023.08)

(58) Field of Classification Search
CPC .. G06F 21/105; G06F 9/4401; G06F 21/1077; G06F 21/121
See application file for complete search history.

(56) References Cited

U.S. PATENT DOCUMENTS

| | | | |
|---|---|---|---|
| 2005/0177823 A1* | 8/2005 | Miyake | G06F 21/10 717/159 |
| 2006/0294019 A1* | 12/2006 | Dayan | G06Q 10/087 705/59 |
| 2008/0235803 A1* | 9/2008 | Harada | G06F 21/57 726/26 |
| 2010/0031352 A1* | 2/2010 | Kethireddy | G06Q 50/184 705/310 |
| 2018/0253809 A1* | 9/2018 | Meyer | G06Q 50/184 |
| 2019/0261170 A1* | 8/2019 | Jiang | H04W 12/08 |
| 2022/0292620 A1* | 9/2022 | Verma | G06Q 50/184 |

* cited by examiner

*Primary Examiner* — Beemnet W Dada

(57) ABSTRACT

A new approach is proposed to support software validation and licensing management. An instance of a software component deployed to a physical computing device is configured to request a copy of license of the software component from a license server out-of-band before the software component can be installed and/or booted up on the physical computing device. Upon receiving a request for the copy of license from the instance of the software component, the license server is configured to grant or deny the request based on the current number of copies of license of the software component available. If the request is granted, the instance of the software component is booted up on the physical computing device. During its operation, the instance of the software component continues to communicate with the license server periodically to indicate whether the copy of license assigned by the server is still in use.

25 Claims, 2 Drawing Sheets

SYSTEM AND METHOD FOR AUTONOMOUS SOFTWARE LICENSING DURING BOOTUP PROCESS

CROSS-REFERENCE TO RELATED APPLICATIONS

This application claims the benefit of U.S. Provisional Patent Application No. 63/305,761, filed Feb. 2, 2022, which is incorporated herein in its entirety by reference.

BACKGROUND

To prevent software theft, a proprietary software generally requires some means of validating legitimacy of a copy of the software by, for non-limiting examples, requesting a user to enter a license key, token, login credentials, and/or to provide access to certain components in the user's environment, etc. Generally, the copy of the software has unique properties (e.g., with some unique built-in variables) that make the copy of the software capable of self-validating. Alternatively, the software must be able to securely transmit the information (user/or surrounding) to a centralized license infrastructure/server for validation (usually over a network) to obtain a copy of license for the software and receive a response on whether the copy of license is granted so that the software may be installed and be functional/operational. For a non-limiting example, an instance of a virtual appliance (or appliance), which can be but is not limited to a virtual machine (VM) instance running either locally on a hypervisor of a physical computing device or in a cloud fall into the latter category, wherein such VM instance faces limitations similar to a physical computing device in its abilities to communicate with the license server experiencing large workloads and/or bandwidth limitations over multiple firewalls during peak time without user-intervention. The paradigm described above may be amplified several-fold when the license server located in a public cloud is under a so-called "auto-scaling" scenario where the number of license requests to validate instances of the virtual appliances can be spun-up and torn-down automatically as triggered by the licensing workload at runtime (e.g., requests for tax filing software may peak during the tax season).

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF EMBODIMENTS

Figure 1:
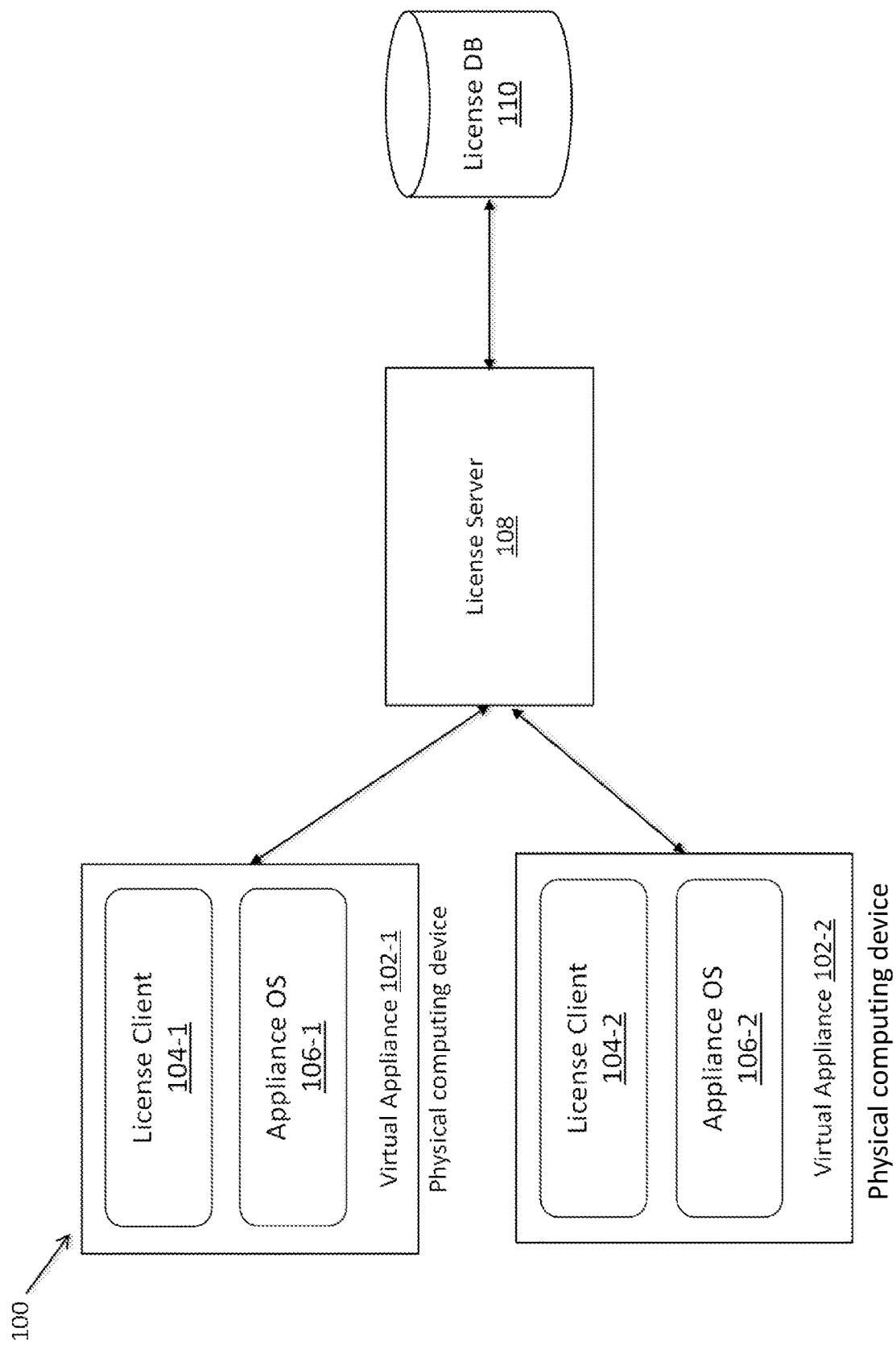
FIG. 1 depicts an example of a system diagram to support software validation and licensing management in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support software validation and licensing management in any computing environment. Under the proposed approach, an instance of a software component deployed to a physical computing device is configured to request a copy of license of the software component from a license server out-of-band before the software component can be installed and/or booted up on the physical computing device. Here, the software component can be but is not limited to a virtual appliance (e.g., a VM instance), an operating system (OS), a container, or any other type of software that requires a copy of license to be installed, and run on the physical computing device. The license server is configured to maintain a certain number of copies of licenses for the software component in a pool/database set by a user. Upon receiving a request for the copy of license from the instance of the software component, the license server is configured to grant or deny the request based on the current number of copies of license of the software component available (e.g., not in use). If the request is granted and the copy of license is received, the instance of the software component is booted up on the physical computing device. During its operation, the instance of the software component continues to communicate with the license server periodically to indicate whether the copy of license assigned by the server is still in use.

Under the proposed approach, the legitimacy of an instance of a software component can be validated automatically in an autoscaling environment when the load of licensing requests changes dynamically over time. The proposed approach provides autonomous license management and validation prior to booting up the instance of the software component as well as self-adaptation and updating ability when certain copies of license of the software component are no longer in use and can be released and reused by other instances of the software component without any user intervention. Since the proposed approach is agnostic to any specific environment (e.g., hypervisor or cloud technology), the license server can be hosted in any cloud environment either a public cloud or a private datacenter of the user where no external network access is provided (also known as a dark site). In addition, the proposed approach enables so-called "boot to fit" capability, which breaks up/pauses the bootup process of the instance of the software component to determine whether the instance of the software component being booted up should continue to be installed in the current computing environment of the physical computing device.

Although instances of a virtual appliance are used hereinafter as non-limiting examples of instances of a software component to illustrate the proposed approach, it is appreciated that the same or similar approach is equally applicable to any other type of software component that requires licensing from a license server. For non-limiting examples, a virtual appliance can be but is not limited to a VM instance or an application software that required licensing to be installed and/or run on a physical computing device.

FIG. 1 depicts an example of a system diagram 100 to support autonomous software licensing during a bootup process. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, wherein the multiple hosts can be connected by one or more networks.

In the example of FIG. 1, the system 100 includes one or more instances of a software component (e.g., a virtual appliance) 102s each including a license client 104 and an appliance operating system (OS) 106, a license server 108, and a license database (DB)/pool 110. Each of the instances of the software component, the server, and/or the components in the system 100 running on one or more computing units or devices each having software instructions stored in a storage such as a non-volatile memory (also referred to as secondary memory) of the computing unit. When the software instructions are executed, at least a subset of the software instructions is loaded into a memory (also referred to as primary memory) by the computing unit, the computing unit becomes a special purposed one for practicing one or more processes.

In the example of FIG. 1, each computing unit running the instances of the virtual appliance, the server, and/or the components in the system 100 can be a computing device, a communication device, a storage device, or any computing device capable of running a software component. For non-limiting examples, a computing device can be but is not limited to a server machine, a laptop PC, a desktop PC, a tablet, a Google Android device, an iPhone, an iPad, and a voice-controlled speaker or controller. Each computing unit has a communication interface (not shown) for communicating with each other over a communication network (not shown), which can be but is not limited to Internet, intranet, wide area network (WAN), local area network (LAN), wireless network, Bluetooth, WiFi, and mobile communication network for internal communications among entities, components, and users of an organization. The physical connections of the communication network and the communication protocols are well known to those skilled in the art.

In the example of FIG. 1, an instance of virtual appliance 102 is deployed to a physical computing device, wherein the instance of the virtual appliance 102 is required to obtain a copy of license of the virtual appliance 102 for validation in order to be installed and run on the computing device to perform certain functionalities. In some embodiments, the instance of the virtual appliance 102 includes at least two software components—a license client 104 and an appliance OS 106. When the instance of the virtual appliance 102 is deployed to the physical computing device, the instance of the virtual appliance 102 is provided with an IP address of the license server 108 to communicate with. When the instance of the virtual appliance 102 starts up, the license client 104 of the instance of the virtual appliance 102 is configured to communicate with the license server 108 to request a copy of license for the virtual appliance 102 in a pre-bootup environment of the instance of the virtual appliance 102 before the appliance OS 106 of the instance of the virtual appliance 102 is booted up. Specifically, at the beginning of the bootup process of the instance of the virtual appliance 102 and before the appliance OS 106 is booted up into the main OS of the physical computing device, the license client 104 is configured to run in a pre-boot environment on the instance of the virtual appliance 102 and to transmit a request to the license server 108 to acquire a copy of license to run the instance of the virtual appliance 102 on the physical computing device. If the request for license is granted and the copy of license is acquired from the license server 108, the bootup process continues and the appliance OS 106 is booted up into the main OS of the physical computing device where the instance of the virtual appliance 102 is deployed, meaning that the instance of the virtual appliance 102 becomes operational. If the request for license is denied by the license server 108, the bootup process will terminate and the instance of the virtual appliance 102 cannot continue to be installed and run because the copy of license cannot be obtained.

In some embodiments, the license client 104 is configured to continue to communicate with the license server 108 about the current status of the instance of the virtual appliance 102, e.g., to indicate that the copy of license it acquired from the license server 108 is still in use, after the instance of the virtual appliance 102 has booted up on the main OS of the physical computing device. In some embodiments, the license client 104 is configured to periodically send one or more heartbeat messages to the license server 108 to indicate that the license is still in use and the license server 108 will reserve that copy of license assigned to that instance of the virtual appliance 102 as long as the one or more heartbeat messages are periodically received by the license server 108. If no heartbeat message has been received from the instance of the virtual appliance 102 over a pre-specified timeout period, meaning that the instance of the virtual appliance 102 may no longer be active, the license server 108 will then release that copy of license assigned to the instance of the virtual appliance 102 back to the license DB 110 to be used by another instance of the virtual appliance 102 if all licenses in the license DB 110 have been assigned or allocated. In some embodiments, if the instance of the virtual appliance 102 is no longer in use, the license client 104 is configured to inform the license server 108 accordingly when the instance of the virtual appliance 102 is shut down on the physical computing device so that the copy of license of the instance of the virtual appliance 102 can be taken back by the license server 108 to be put back into the license DB 110 for use by other instances of the virtual appliance 102.

In the example of FIG. 1, the license server 108 is configured to automatically manage a pool of a plurality of copies of licenses of the virtual appliance 102, wherein the plurality of copies of licenses are maintained in the license DB 110. Here, the license server 108 can be hosted in any cloud environment, e.g., either a public cloud that is publicly accessible over the Internet or at a private datacenter of the user where no external network access is provided (e.g., a dark site). In some embodiments, the number of the plurality of copies of licenses in the license DB 110 for the virtual appliance 102 can be set by a user via a user interface (UI) and populated by the license server 108. In some embodiments, the plurality of copies of licenses are stored in a digitally-signed license file and the license server 108 is configured to verify that the license file is authentic before populating the license DB 110 with the plurality of copies of licenses in the digitally-signed license file. In some embodiments, the license DB 110 is configured to persist and maintain the plurality of copies of licenses together with their current statuses, which can be but are not limited to whether each of the plurality of copies of licenses is free/available or in-use by an instance of the virtual appliance 102.

When the request for a copy of license of the virtual appliance 102 has been received, the license server 108 is configured to check the license DB 110 to determine if there is a copy of license of the virtual appliance 102 available. If so, the license server 108 is configured to assign the copy of license of the virtual appliance 102 to the instance of the virtual appliance 102 that requested it. If it is determined that every copy of license of the virtual appliance 102 in the license DB 110 is in use, the license server 108 may deny the request for a copy of license by the instance of the virtual appliance 102. If there is no copy of license of the virtual instance 102 available, the instance of the virtual appliance 102 may terminate the current bootup process and take a different boot path/process. In some embodiments, the instance of the virtual appliance 102 may boot up and run with limited functionalities without a copy of license of the virtual instance 102. In some embodiments, a user of the instance of the virtual appliance 102 may acquire or purchase additional copies of license of the virtual appliance 102 and make the additional copies of license available in the license DB 110. In some embodiments, the instance of the virtual appliance 102 is configured to perform an out-of-band lookup to determine which path to boot up, wherein the out-of-band lookup may identify one or more alternative bootup processes either pre-defined by the user and automatically determined by the instance of the virtual appliance 102 when a copy of license for the virtual appliance 102 is not available.

Figure 2:
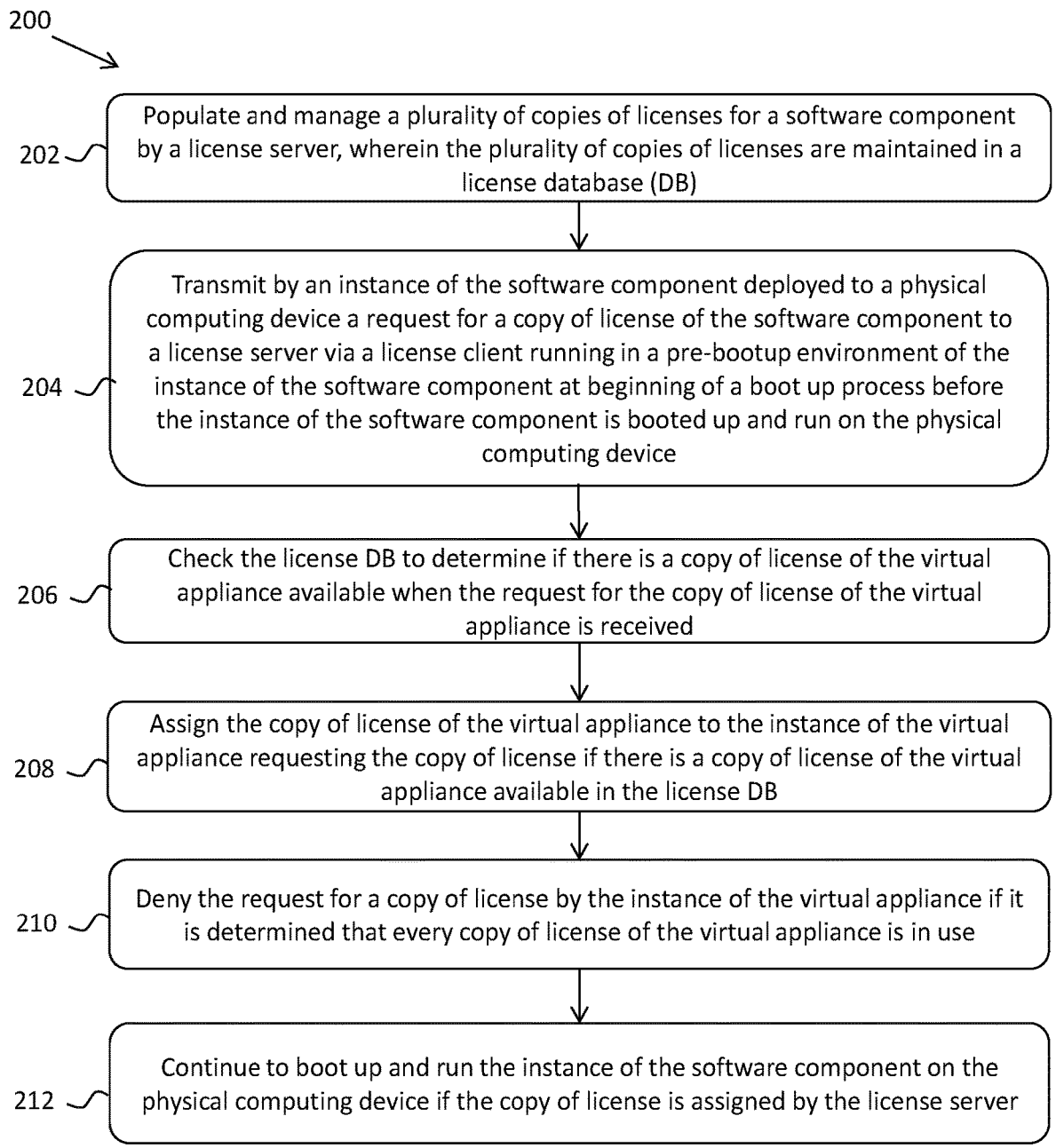
FIG. 2 depicts a flowchart of an example of a process to support software validation and licensing management in accordance with some embodiments.

FIG. 2 depicts a flowchart 200 of an example of a process to support software validation and licensing management. Although the figure depicts functional steps in a particular order for purposes of illustration, the processes are not limited to any particular order or arrangement of steps. One skilled in the relevant art will appreciate that the various steps portrayed in this figure could be omitted, rearranged, combined, and/or adapted in various ways.

In the example of FIG. 2, the flowchart 200 starts at block 202, where a plurality of copies of licenses for a software component are populated and managed by a license server, wherein the plurality of copies of licenses are maintained in a license database (DB). The flowchart 200 continues to block 204, where a request for a copy of license of the software component is transmitted by an instance of the software component deployed to a physical computing device to a license server via a license client running in a pre-bootup environment of the instance of the software component at beginning of a bootup process before the instance of the software component is booted up and run on the physical computing device. The flowchart 200 continues to block 206, where the license DB is checked to determine if there is a copy of license of the virtual appliance available when the request for the copy of license of the virtual appliance is received. The flowchart 200 continues to block 208, where the copy of license of the virtual appliance is assigned to the instance of the virtual appliance requesting the copy of license if there is a copy of license of the virtual appliance available in the license DB. The flowchart 200 continues to block 210, where the request for a copy of license by the instance of the virtual appliance is denied if it is determined that every copy of license of the virtual appliance is in use. The flowchart 200 ends at block 212, where the instance of the software component is continued to boot up and run on the physical computing device if the copy of license is assigned by the license server.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

The methods and system described herein may be at least partially embodied in the form of computer-implemented processes and apparatus for practicing those processes. The disclosed methods may also be at least partially embodied in the form of tangible, non-transitory machine-readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

What is claimed is:

1. A system, comprising:
a physical computing device;
an instance of a software component deployed to the physical computing device and configured to
transmit a request for a copy of license of the software component to a license server via a license client running in a pre-bootup environment of the instance of the software component at beginning of a bootup process before the instance of the software component is booted up and run on the physical computing device; and
continue to boot up and run on the physical computing device if the copy of license is assigned by the license server;
said license server configured to
populate and manage a plurality of copies of licenses for the software component, wherein the plurality of copies of licenses are maintained in a license database (DB);
check the license DB to determine if there is a copy of license of the virtual appliance available when the request for the copy of license of the virtual appliance is received;
assign the copy of license of the virtual appliance to the instance of the virtual appliance requesting the copy of license if there is a copy of license of the virtual appliance available in the license DB; and
deny the request for a copy of license by the instance of the virtual appliance if it is determined that every copy of license of the virtual appliance is in use.

2. The system of claim 1, wherein:
the software component is one of a virtual appliance, an operating system (OS), a container, or a type of software that requires the copy of license to be installed and run on the physical computing device.

3. The system of claim 1, wherein:
the license server is hosted in a public cloud that is publicly accessible over Internet.

4. The system of claim 1, wherein:
the license server is hosted at a private datacenter where no external network access is provided.

5. The system of claim 1, further comprising:
said license DB configured to maintain the plurality of copies of licenses of the software component together with their current statuses indicating whether each of the plurality of copies of licenses is available or in-use.

6. The system of claim 1, wherein:
the instance of the software component is configured to continue to communicate with the license server periodically about current status of the instance of the virtual appliance after the instance of the virtual appliance has booted up on the physical computing device.

7. The system of claim 6, wherein:
the instance of the software component is configured to inform the license server accordingly when the instance of the virtual appliance is shut down so that the copy of license of the instance of the virtual appliance is taken back by the license server to be put back into the license DB for use by other instances of the virtual appliance.

8. The system of claim 6, wherein:
the license server is configured to reserve the copy of license assigned to the instance of the virtual appliance as long as one or more heartbeat messages are periodically received by the license server.

9. The system of claim 6, wherein:
the license server is configured to release the copy of license assigned to the instance of the virtual appliance back to the license DB to be used by another instance of the virtual appliance if no heartbeat message has been received from the instance of the virtual appliance over a pre-specified timeout period.

10. The system of claim 1, wherein:
the license server is configured to
store the plurality of copies of licenses in a digitally-signed license file;
verify that the license file is authentic before populating the license DB with the plurality of copies of licenses in the digitally-signed license file.

11. The system of claim 1, wherein:
the instance of the virtual appliance is configured to terminate the bootup process if there is no copy of license of the virtual instance available.

12. The system of claim 1, wherein:
the instance of the virtual appliance is configured to boot up and run with limited functionalities if there is no copy of license of the virtual instance available.

13. The system of claim 1, wherein:
the instance of the virtual appliance is configured to perform an out-of-band lookup to determine which path to boot up, wherein the out-of-band lookup identifies one or more alternative bootup processes either pre-defined by a user and automatically determined by the instance of the virtual appliance if there is no copy of license of the virtual instance available.

14. A computer-implemented method, comprising:
populating and managing a plurality of copies of licenses for a software component by a license server, wherein the plurality of copies of licenses are maintained in a license database (DB);
transmitting by an instance of the software component deployed to a physical computing device a request for a copy of license of the software component to a license server via a license client running in a pre-bootup environment of the instance of the software component at beginning of a boot up process before the instance of the software component is booted up and run on the physical computing device;
checking the license DB to determine if there is a copy of license of the virtual appliance available when the request for the copy of license of the virtual appliance is received;
assigning the copy of license of the virtual appliance to the instance of the virtual appliance requesting the copy of license if there is a copy of license of the virtual appliance available in the license DB;
denying the request for a copy of license by the instance of the virtual appliance if it is determined that every copy of license of the virtual appliance is in use;
continuing to boot up and run the instance of the software component on the physical computing device if the copy of license is assigned by the license server.

15. The method of claim 14, further comprising:
hosting the license server in a public cloud that is publicly accessible over Internet.

16. The method of claim 14, further comprising:
hosting the license server at a private datacenter where no external network access is provided.

17. The method of claim 14, further comprising:
maintaining the plurality of copies of licenses of the software component in said license DB together with their current statuses indicating whether each of the plurality of copies of licenses is available or in-use.

18. The method of claim 14, further comprising:
continuing to communicate with the license server periodically about current status of the instance of the virtual appliance after the instance of the virtual appliance has booted up on the physical computing device.

19. The method of claim 18, further comprising:
informing the license server accordingly when the instance of the virtual appliance is shut down so that the copy of license of the instance of the virtual appliance is taken back by the license server to be put back into the license DB for use by other instances of the virtual appliance.

20. The method of claim 18, further comprising:
reserving the copy of license assigned to the instance of the virtual appliance as long as one or more heartbeat messages are periodically received by the license server.

21. The method of claim 18, further comprising:
releasing the copy of license assigned to the instance of the virtual appliance back to the license DB to be used by another instance of the virtual appliance if no heartbeat message has been received from the instance of the virtual appliance over a pre-specified timeout period.

22. The method of claim 14, further comprising:
storing the plurality of copies of licenses in a digitally-signed license file;
verifying that the license file is authentic before populating the license DB with the plurality of copies of licenses in the digitally-signed license file.

23. The method of claim 14, further comprising:
terminating the bootup process if there is no copy of license of the virtual instance available.

24. The method of claim 14, further comprising:
booting up and running the instance of the virtual appliance with limited functionalities if there is no copy of license of the virtual instance available.

25. The method of claim 14, further comprising:
performing an out-of-band lookup to determine which path to boot up, wherein the out-of-band lookup identifies one or more alternative bootup processes either pre-defined by a user and automatically determined by the instance of the virtual appliance if there is no copy of license of the virtual instance available.

* * * * *